United States Patent
Iijima et al.

(10) Patent No.: US 11,015,612 B2
(45) Date of Patent: May 25, 2021

(54) TURBINE HOUSING

(71) Applicant: Marelli Corporation, Saitama (JP)

(72) Inventors: Tooru Iijima, Saitama (JP); Takaharu Yamamoto, Saitama (JP); Yoshihiro Shiga, Saitama (JP)

(73) Assignee: Marelli Corporation, Saitama (JP)

( * ) Notice: Subject to any disclaimer, the term of this patent is extended or adjusted under 35 U.S.C. 154(b) by 57 days.

(21) Appl. No.: 16/611,625

(22) PCT Filed: May 8, 2018

(86) PCT No.: PCT/JP2018/017708
§ 371 (c)(1),
(2) Date: Nov. 7, 2019

(87) PCT Pub. No.: WO2018/207754
PCT Pub. Date: Nov. 15, 2018

(65) Prior Publication Data
US 2020/0158130 A1 May 21, 2020

(30) Foreign Application Priority Data
May 10, 2017 (JP) .............................. JP2017-093641

(51) Int. Cl.
*F04D 29/42* (2006.01)
*F04D 29/08* (2006.01)
*F04D 17/10* (2006.01)

(52) U.S. Cl.
CPC ......... *F04D 29/4206* (2013.01); *F04D 17/10* (2013.01); *F04D 29/083* (2013.01)

(58) Field of Classification Search
CPC .... F01D 25/24; F04D 29/4206; F04D 29/083; F04D 17/10
See application file for complete search history.

(56) References Cited

U.S. PATENT DOCUMENTS

| | | | |
|---|---|---|---|
| 8,382,429 B2* | 2/2013 | Grussmann | F01D 11/005 415/213.1 |
| 8,726,655 B2* | 5/2014 | Smatloch | F01D 25/243 60/602 |

(Continued)

FOREIGN PATENT DOCUMENTS

| | | |
|---|---|---|
| EP | 2662532 A2 | 11/2013 |
| EP | 3354855 A1 | 8/2018 |

(Continued)

OTHER PUBLICATIONS

JP-2007002791-A English Translation (Year: 2007).*

*Primary Examiner* — Shafiq Mian
(74) *Attorney, Agent, or Firm* — Young Basile Hanlon & MacFarlane, P.C.

(57) ABSTRACT

A turbine housing includes an inner pipe and an outer pipe, the inner pipe being configured to form an exhaust air flow path between an exhaust-air-inlet-side flange and an exhaust-air-outlet-side flange, and an outer pipe being configured to cover the inner pipe such that a predetermined spacing is formed between the inner pipe and the outer pipe. The inner pipe has: an inner pipe main body configured to form the exhaust air flow path having a spiral shape, the inner pipe main body being connected to the exhaust-air-inlet-side flange such that exhaust gas is allowed to enter between the inner pipe and the outer pipe; and an exhaust tube attached to an exhaust air outlet side of the inner pipe main body in a freely slidable manner with an intervening sealing member.

12 Claims, 10 Drawing Sheets

(56) References Cited

U.S. PATENT DOCUMENTS

2005/0133012 A1  6/2005  Grussmann et al.
2012/0023928 A1  2/2012  Smatloch et al.
2014/0241858 A1  8/2014  Tashiro et al.
2018/0016942 A1  1/2018  Sakamoto et al.

FOREIGN PATENT DOCUMENTS

| | | |
|---|---|---|
| EP | 3372801 A1 | 9/2018 |
| EP | 3730761 A1 | 10/2020 |
| EP | 3734039 A1 | 11/2020 |
| JP | 2005-147139 A | 6/2005 |
| JP | 2007-2791 A | 1/2007 |
| JP | 2007002791 A * | 1/2007 |
| JP | 2011-153623 A | 8/2011 |
| JP | 2013-68153 A | 4/2013 |
| JP | 2013-526673 A | 6/2013 |
| JP | 2015224570 A | 12/2015 |
| JP | 2016-31027 A | 3/2016 |
| JP | WO2019130879 A1 | 12/2019 |
| WO | 2011144206 A1 | 11/2011 |
| WO | 2016/139799 A1 | 9/2016 |
| WO | 2019/123908 A1 | 6/2019 |
| WO | 2019/130879 A1 | 7/2019 |

\* cited by examiner

TURBINE HOUSING

CROSS-REFERENCE TO RELATED APPLICATION

This application claims priority to Japanese Patent Application Serial No. 2017-093641, filed May 10, 2017, the entire disclosure of which is hereby incorporated by reference.

TECHNICAL FIELD

The present invention relates to a turbine housing used for a turbocharger of a vehicle.

BACKGROUND

As turbine housings used for turbochargers, those made by casting are generally known. In contrast, a turbine housing made of sheet metal is disclosed in JP2013-526673A.

The turbine housing disclosed in JP2013-526673A is provided with, in an outer housing, an inner housing that has a tubular short tube and an outlet tube that communicates with an exhaust gas device. In the turbine housing, the outlet tube is coupled to the tubular short tube so as to be movable with each other with a sealing ring.

SUMMARY

However, with the conventional turbine housing, because the entire inner housing is made of the sheet metal, despite its light weight, deformation, cracking, and so forth tend to be caused due to heat, and it is difficult to ensure durability.

The present invention has been conceived in order to solve the above-described problems, and an object thereof is to provide a highly durable turbine housing capable of allowing displacement of an inner pipe having an exhaust air flow path due to thermal expansion and capable of effectively absorbing the thermal expansion of the inner pipe.

A turbine housing according to one aspect of the present invention includes an inner pipe and an outer pipe, the inner pipe being configured to form an exhaust air flow path, in which a turbine wheel is arranged, between an exhaust-air-inlet-side flange forming an inlet of exhaust gas and an exhaust-air-outlet-side flange forming an outlet of the exhaust gas, and the outer pipe being configured to cover the inner pipe such that a predetermined spacing is formed between the inner pipe and the outer pipe, wherein the exhaust gas that has passed the turbine wheel is discharged from an exhaust tube located on the exhaust air outlet side of the inner pipe. The inner pipe is constituted from a sheet-metal-made first scroll member; a cast-metal-made second scroll member having higher heat resistance than the first scroll member; and a sheet-metal-made exhaust tube. A region of the inner pipe on the side of the exhaust air outlet of the exhaust gas is formed by the second scroll member. In addition, the outer pipe is constituted from sheet-metal-made outer pipe members that are formed by being divided into at least two members. A barrel shaped portion is formed on the exhaust air outlet side of the second scroll member. An end portion side of the exhaust tube is attached to the barrel shaped portion in a freely slidable manner with an intervening sealing member.

With the turbine housing according to one aspect of the present invention, it is possible to increase durability on the exhaust air outlet side of the inner pipe including the exhaust tube, and at the same time, it is possible to secure a clearance (tip clearance) between the inner pipe and the turbine wheel over a period of time with ease and with reliability. In addition, because the end portion side of the exhaust tube of the inner pipe is attached to the barrel shaped portion with the intervening sealing member in a freely slidable manner, it is possible to ensure highly efficient turbo performance.

DETAILED DESCRIPTION

Embodiments of the present invention will be described below with reference to the attached drawings. In the following description of the drawings, the same or similar components are assigned the same or similar reference signs. In a case in which only a part of the configuration of each embodiment is described, for other members of the configuration, the configuration of another embodiment, which has been described previously, can be applied.

An embodiment of the present invention will be described below with reference to the drawings.

First Embodiment

Figure 1:
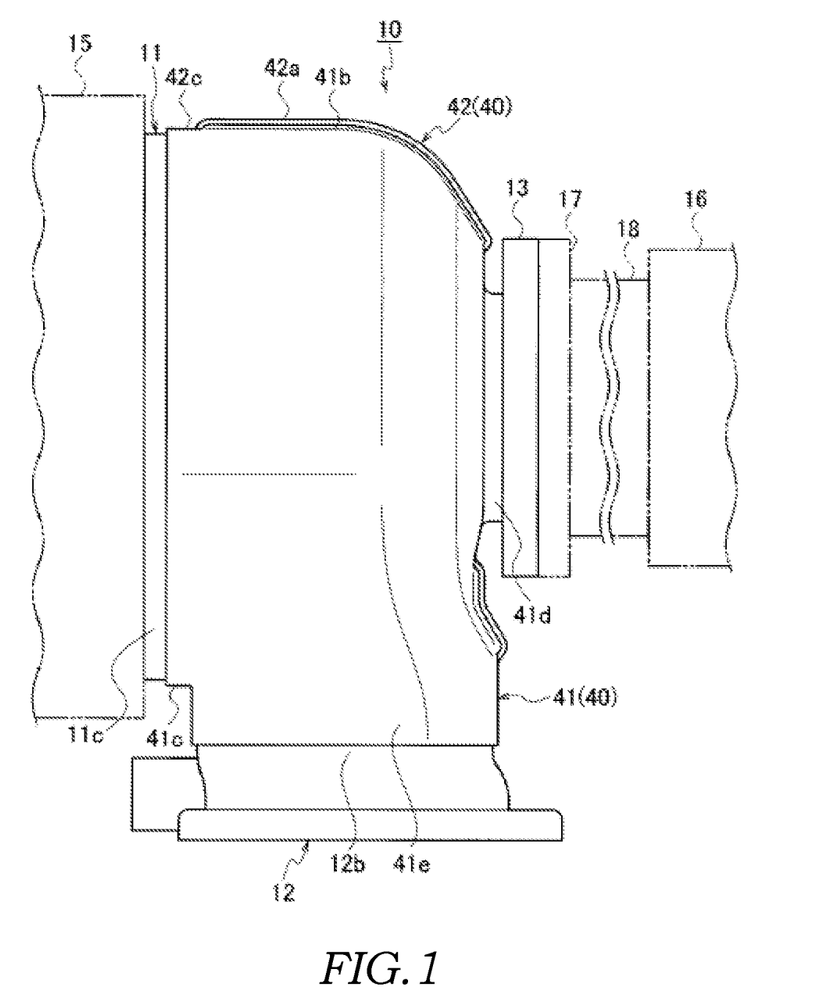
FIG. 1 is a side view of a turbine housing used for a turbocharger of a first embodiment of the present invention.
Figure 2:
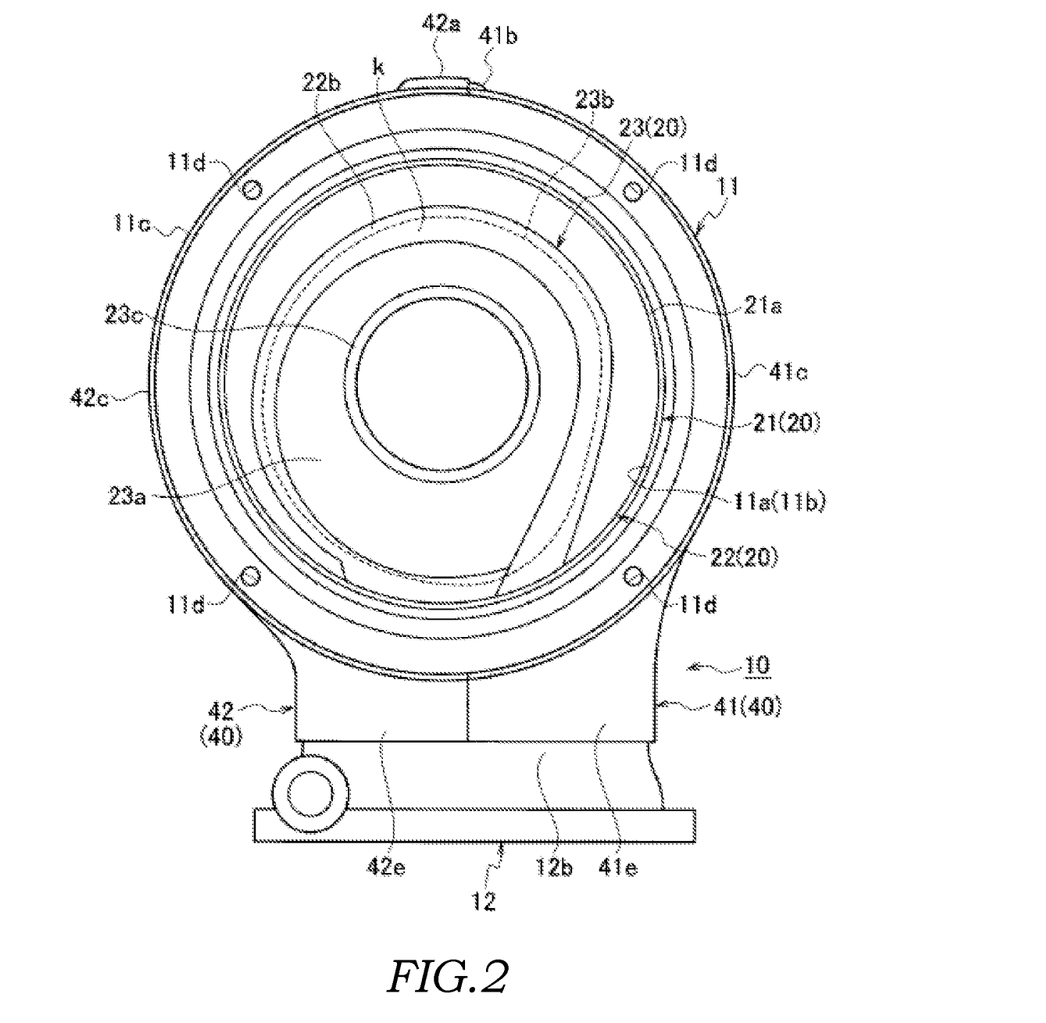
FIG. 2 is a front view of the above-described turbine housing.
Figure 3:
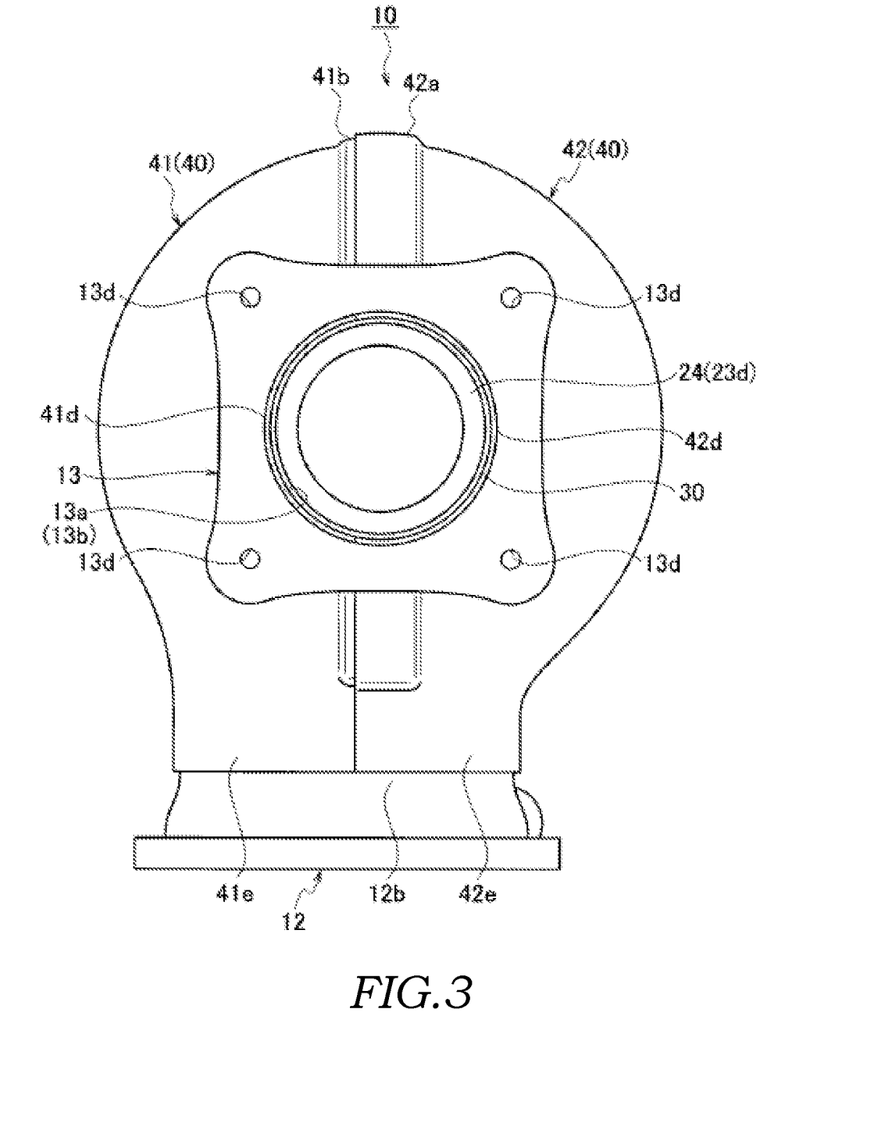
FIG. 3 is a rear view of the above-described turbine housing.
Figure 4:
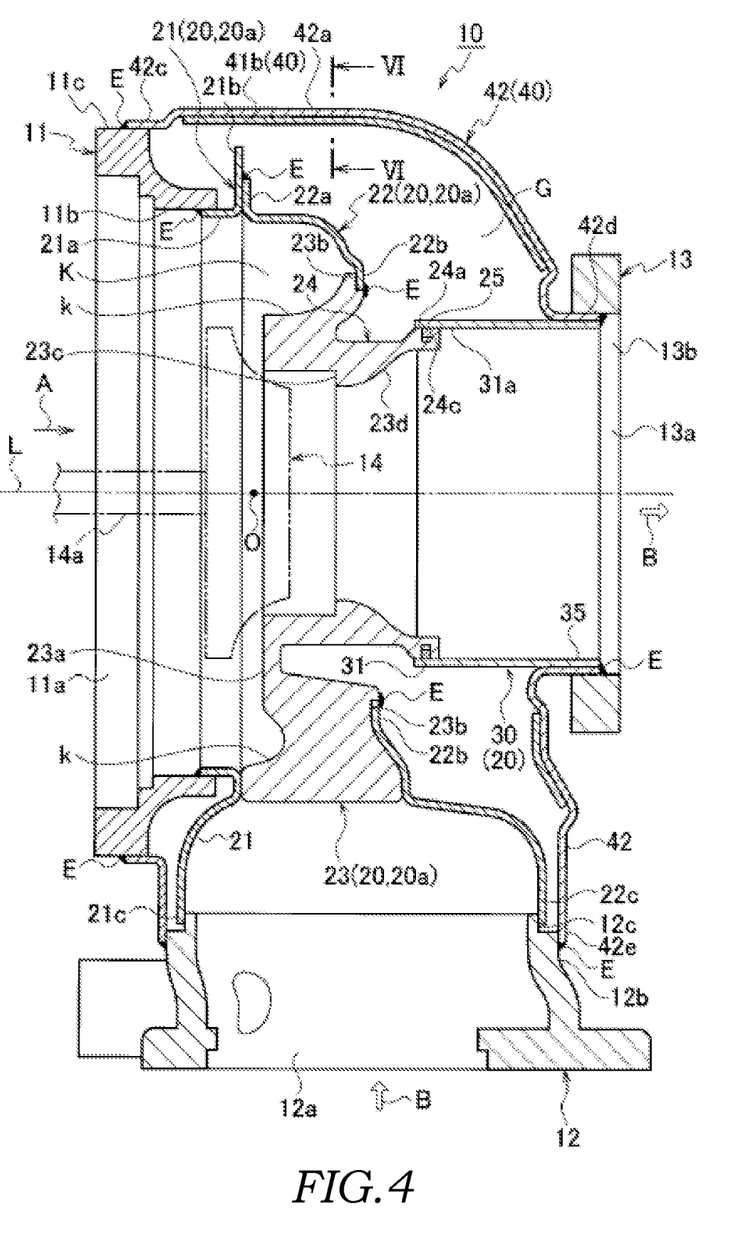
FIG. 4 is a sectional view of the above-described turbine housing.
Figure 5A:
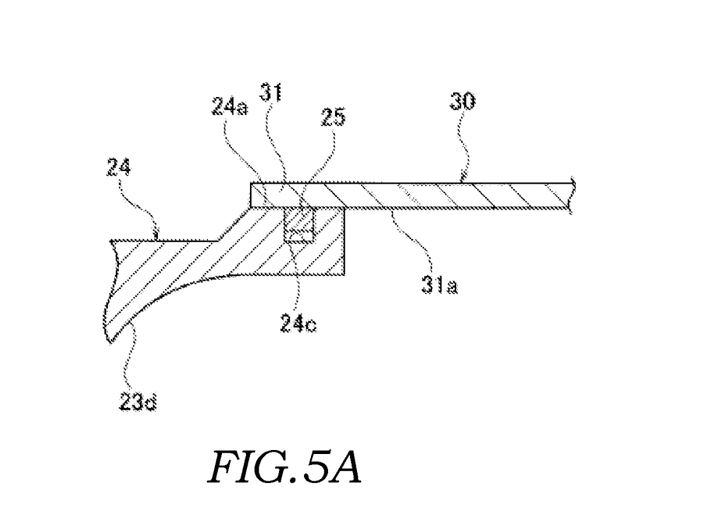
FIG. 5A is a partially enlarged sectional view showing a sealing state between a cast-metal-made scroll member and an exhaust tube of the above-described turbine housing.
Figure 5B:
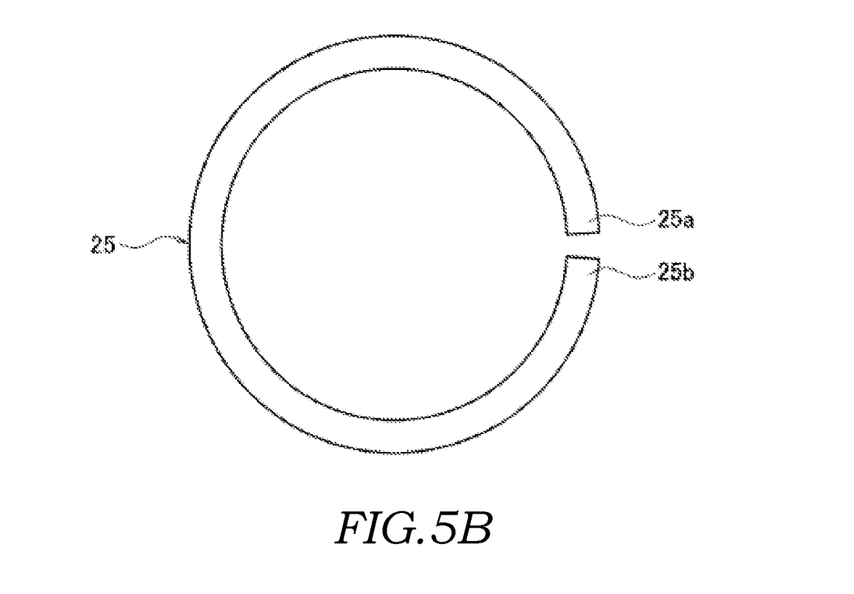
FIG. 5B is a front view of a sealing ring used for a sealing between the cast-metal-made scroll member and the exhaust tube.
Figure 6:
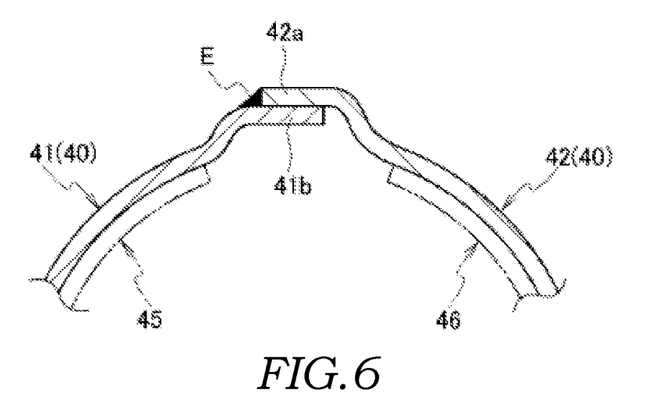
FIG. 6 is a sectional view taken along line VI-VI in FIG. 4.
Figure 7:
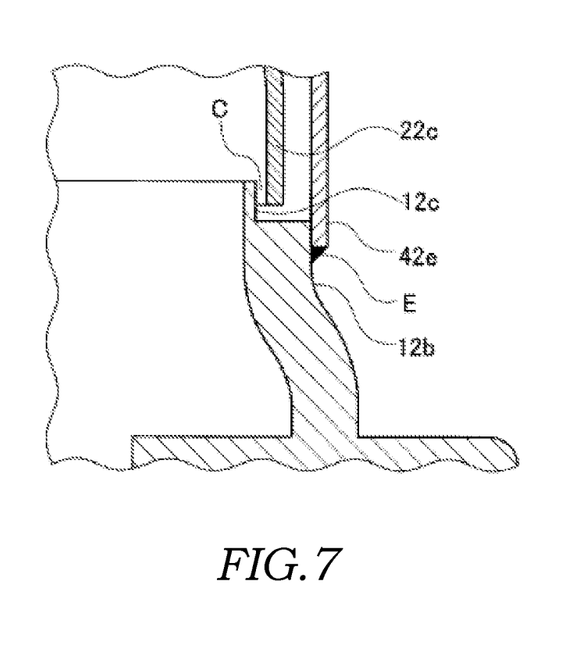
FIG. 7 is a partially enlarged sectional view showing a connecting portion between an exhaust-air-inlet-side flange and an inner pipe.
Figure 8:
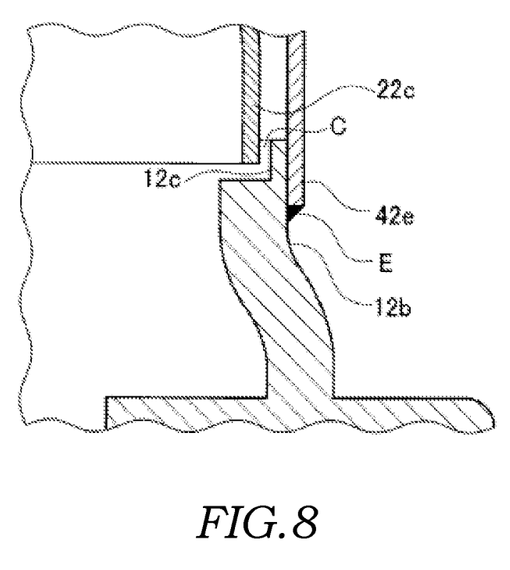
FIG. 8 is a partially enlarged sectional view showing a modification of FIG. 7.

FIG. 1 is a side view of a turbine housing used for a turbocharger of a first embodiment of the present invention, FIG. 2 is a front view of the turbine housing, FIG. 3 is a rear view of the turbine housing, FIG. 4 is a sectional view of the turbine housing, FIG. 5A is a partially enlarged sectional view showing a sealing state between a cast-metal-made scroll member and an exhaust tube of the turbine housing, FIG. 5B is a front view of the sealing ring used for the sealing between the cast-metal-made scroll member and the exhaust tube, and FIG. 6 is a sectional view taken along line VI-VI in FIG. 4. FIG. 7 is a partially enlarged sectional view showing a state in which an inner pipe is fitted into an exhaust-air-inlet-side flange, and FIG. 8 is a partially enlarged sectional view showing a modification of the state shown in FIG. 7.

A turbine housing 10 is used as a housing of a turbocharger of a vehicle. As shown in FIGS. 1 to 4, the turbine housing 10 is provided with: an intake-air-inlet-side flange 11 that forms an inlet 11a for intake air (intake air) A; an exhaust-air-inlet-side flange 12 that forms an inlet 12a for exhaust gas B; an exhaust-air-outlet-side (the downstream side of exhaust air flow) flange 13 that forms an outlet 13a for the exhaust gas B; an inner pipe 20 serving as a scroll portion for forming a spiral exhaust gas flow path (exhaust air flow path) K that is provided between the exhaust-air-inlet-side flange 12 and the exhaust-air-outlet-side flange 13; an exhaust tube 30 that forms a part of the inner pipe 20 (the rear end side) connected to a portion (a cylinder shaped portion 24) of the inner pipe 20 on the exhaust air outlet side; and an outer pipe 40 that covers the inner pipe 20 and the exhaust tube 30 such that a space (predetermined spacing) G is formed therebetween. In other words, the turbine housing 10 is formed to have a so called double-wall structure. With the turbine housing 10, the exhaust gas B that has entered from the inlet 12a of the exhaust-air-inlet-side flange 12 is discharged from the outlet 13a of the exhaust-air-outlet-side flange 13 via a turbine wheel 14 that is provided at the spiral center portion (center portion) O of the inner pipe 20.

For the sake of convenience of description, the shaft direction L of a turbine shaft 14a of the turbine wheel 14 in the turbine housing 10 is referred to as the front-rear direction, and a predetermined one direction that is orthogonal to the front-rear direction is referred to as the vertical direction.

As shown in FIG. 1, a compressor 15 for introducing the intake air A from the outside is connected to the intake-air-inlet-side flange 11. In addition, a catalytic converter (emission control device) 16 for removing toxic pollutants from the exhaust gas B is connected via a joint flange 17 and a joint tube 18 to the exhaust-air-outlet-side flange 13 through which the exhaust gas B is discharged. In other words, the turbine housing 10 is disposed between the compressor 15 provided on the intake air side and the catalytic converter 16.

As shown in FIGS. 2 and 4, the inner pipe (scroll portion) 20 has an inner pipe main body 20a and the exhaust tube 30 that is connected to the exhaust air outlet side of the inner pipe main body 20a. The inner pipe main body 20a essentially defines and forms the spiral exhaust gas flow path K for the exhaust gas B in the turbine housing 10 and is connected to the exhaust-air-inlet-side flange 12 such that the exhaust gas B can enter between the inner pipe 20 and the outer pipe 40. The outer pipe 40 entirely covers the inner pipe 20 and the exhaust tube 30 such that the space (predetermined spacing) G is formed therebetween so as to protect and thermally insulate the inner pipe 20 and the exhaust tube 30 at the same time. The outer pipe 40 also forms an outer shell structure that achieves the purpose of increasing rigidity of the turbine housing 10 as a whole.

As shown in FIG. 4, the inner pipe 20 in the turbine housing 10 of the first embodiment is constituted from: a first inner pipe divided body 21 and a second inner pipe divided body 22 that are formed by being divided into two members along the direction orthogonal to the shaft direction L of the turbine shaft 14a of the turbine wheel 14; the inner pipe main body 20a; and the sheet-metal-made cylinder shaped exhaust tube 30. The first inner pipe divided body 21 and the second inner pipe divided body 22 are formed of thin plate-like shaped sheet-metal-made scroll members. The inner pipe main body 20a is provided with a third inner pipe divided body (cast portion) 23 that is formed of a scroll plate member made of the cast metal, which is formed by casting as a material having higher heat resistance than the material made of the sheet metal. The scroll plate member is located at a regional part facing the turbine wheel 14 (the region on the side of the exhaust air outlet of the exhaust gas B).

As shown in FIGS. 2 and 4, the first inner pipe divided body 21 and the second inner pipe divided body 22 are press-formed into a predetermined curved tube shape by subjecting the sheet metal to press working. Then, a rear-circumferential-edge-side end portion 21b and a front-circumferential-edge-side end portion 22a of two press-formed members made of the sheet metal, i.e. the first inner pipe divided body 21 and the second inner pipe divided body 22, respectively, are jointed and fixed by being welded. In other words, the end portion 21b of the first inner pipe divided body 21 on the rear circumferential edge side and the end portion 22a of the second inner pipe divided body 22 on the front circumferential edge side are formed by bending outwards so as to have different vertical lengths, and these end portions 21b and 22a having different lengths are mutually fixed by being welded (a welded portion is shown by a reference sign E).

In addition, as shown in FIGS. 2 and 4, the third inner pipe divided body 23 is molded into the predetermined curved tube shape from the cast metal part. As shown in FIGS. 4, 5A and 5B, an end portion 22b of the sheet-metal-made second inner pipe divided body 22 on the rear circumferential edge side is joined and fixed to an end portion 23b having a stepped-recessed shape of the cast-metal-made third inner pipe divided body 23 on the rear outer circumference edge side by being welded (a welded portion is shown by the reference sign E) on the reverse side surface of a flow path surface k of an exhaust gas flow path K. With such a configuration, the regional part of the inner pipe 20 facing the turbine wheel 14 as the region on the side of the exhaust air outlet of the exhaust gas B is formed of the cast-metal-made third inner pipe divided body 23 that is made of the cast-metal-made scroll member, and the remaining regional part of the inner pipe 20 is formed of the sheet-metal-made first inner pipe divided body 21 and the sheet-metal-made second inner pipe divided body 22 that are made of the sheet-metal-made scroll plate members. An interior of the inner pipe 20 forms the spiral exhaust gas flow path K.

Furthermore, as shown in FIGS. 2 and 4, a front surface 23a (front side) of the cast-metal-made third inner pipe divided body 23 is made to have a flat portion, and is formed such that the area of the lower part of the front surface 23a (in other words, the area of the front surface 23a on the exhaust air inlet side where the exhaust-air-inlet-side flange 12 is arranged) is larger than the area of the upper part of the front surface 23a (in other words, the area of the front surface 23a on the opposite side from the exhaust-air-inlet-side flange 12). In other words, as shown in FIG. 4, the cast-metal-made third inner pipe divided body 23 is formed such that the regional part towards the exhaust-air-inlet-side flange 12 (the lower side) has greater thickness than the regional part on the opposite side thereof (the upper side). With such a configuration, a part of the flow path surface k of the exhaust gas flow path K of the inner pipe 20 is formed by the cast-metal-made third inner pipe divided body 23.

Furthermore, a recessed portion 23c having a stepped-annular shape is formed on the exhaust air inlet side of the regional part facing the turbine wheel 14 as the region on the side of the exhaust air outlet of the exhaust gas B in the cast-metal-made third inner pipe divided body 23. In the exhaust air outlet side of the regional part, the cylinder shaped portion (barrel shaped portion) 24 is integrally formed so as to project out. A reinforcing member (not shown) having an annular ring shape for protecting the turbine wheel 14 is fitted into the recessed portion 23c having the stepped-annular shape.

In addition, as shown in FIG. 4, an inner wall of the cylinder shaped portion 24 is formed as an inclined surfaces 23d having a substantially conical shape, the diameter of which increases smoothly towards the outlet side. A front-side end portion 31 of the exhaust tube 30 is attached by being fitted into an outer circumferential surface 24a of the cylinder shaped portion 24 such that the end portion 31 side of the exhaust tube 30 is freely slidable with an intervening sealing ring (sealing member) 25. More specifically, as shown in FIGS. 4 and 5A, a recessed groove portion (accommodating portion) 24c for accommodating the sealing ring 25 is formed in the outer circumferential surface 24a of the cylinder shaped portion 24 so as to have an annular shape. The sealing ring 25 is fitted into the recessed groove portion 24c having the annular shape. Thereafter, the front-side end portion 31 side of the exhaust tube 30 is attached to the outer circumferential surface 24a of the cylinder shaped portion 24 with the intervening sealing ring 25 so as to be freely slidable.

As shown in FIGS. 5A and 5B, the sealing ring 25 is formed so as to have a C-shape when viewed in the front view and such that both end portions 25a and 25b are opened outward by being pressed. As the sealing ring 25 is pressed and the both end portions 25a and 25b are opened, it is possible to allow the exhaust tube 30 to slide while generating contact pressure, and therefore, it is possible to seal a gap between the outer circumferential surface 24a of the cylinder shaped portion 24 and an inner circumferential surface 31a of the front-side end portion 31 of the exhaust tube 30 with ease and with reliability.

As shown in FIGS. 1 to 4, the outer pipe 40 is constituted from two sheet-metal-made thin plate members (outer pipe members made of sheet metal), i.e. a first outer pipe divided body 41 and a second outer pipe divided body 42, formed by halving the outer pipe 40 along the shaft direction L (the direction of vibration during the travel of the vehicle) of the turbine shaft 14a of the turbine wheel 14. The first outer pipe divided body 41 and the second outer pipe divided body 42 are formed into a predetermined curved shape by subjecting the sheet metal to the press working. Two press-formed members, i.e. the sheet-metal-made first outer pipe divided body 41 and the sheet-metal-made second outer pipe divided body 42, are joined by the welding, and thereby, the inner pipe 20 and the exhaust tube 30 are entirely covered with the space G formed therebetween.

In other words, as shown in FIGS. 1, 3, 4, and 6, a second end portion 41b of the sheet-metal-made first outer pipe divided body 41 extending by forming a step and a first end portion 42a of the sheet-metal-made second outer pipe divided body 42 extending by forming a step are fixed to each other by overlaying the first end portion 42a on the second end portion 41b of the first outer pipe divided body 41 and by being welded (welded portions are shown by the reference sign E) along the shaft direction (shaft line direction) L of the turbine shaft 14a of the turbine wheel 14. With such a configuration, because expansion and/or contraction is caused about the shaft direction L of the turbine shaft 14a during the travel of the vehicle, the welding is performed along the shaft direction L, and thereby, a fracture of the weld line is prevented.

In addition, as shown in FIG. 6, to inner surfaces of the sheet-metal-made first outer pipe divided body 41 and the sheet-metal-made second outer pipe divided body 42 constituting the outer pipe 40, sheet-metal-made plates (reinforcing plate members) 45 and 46, which are formed by being press molded so as to follow the curved shape of the outer pipe 40, are respectively fixed by being welded at least one point (spot welding).

As shown in FIGS. 2 and 4, the intake-air-inlet-side flange 11 is formed to have an annular shape, and a circular opening portion 11a forms the inlet of the intake air A at its center. An end portion 21a of the sheet-metal-made first inner pipe divided body 21 of the inner pipe 20 on the front circumferential edge side is fixed to an inner circumferential surface 11b of the intake-air-inlet-side flange 11 by being welded (a welded portion is shown by the reference sign E). In addition, to an outer circumferential surface 11c of the intake-air-inlet-side flange 11, respective end portions 41c and 42c of the sheet-metal-made first outer pipe divided body 41 and the sheet-metal-made second outer pipe divided body 42 constituting the outer pipe 40 on the front circumferential edge side are fixed by being welded (welded portions are shown by the reference sign E). A plurality of screw holes 11d for attaching bolts are formed in the intake-air-inlet-side flange 11 at equal intervals.

As shown in FIG. 4, the exhaust-air-inlet-side flange 12 is formed so as to have a substantially annular shape, and its opening portion 12a forms the inlet of the exhaust gas B. A recessed portion 12c having the stepped-annular shape is formed in the top side of an outer circumferential surface 12b of the exhaust-air-inlet-side flange 12. In the inner pipe 20, a bottom end portion 21c side of the sheet-metal-made first inner pipe divided body 21 and a bottom end portion 22c side of the sheet-metal-made second inner pipe divided body 22 are respectively formed to have a curved half-arc shape so as to follow the recessed portion 12c, and the first inner pipe divided body 21 and the second inner pipe divided body 22 are fitted into the recessed portion 12c by being brought into contact in a freely slidable manner.

In the turbine housing 10 of the first embodiment, the exhaust-air-inlet-side flange 12 is made of the cast metal. In this configuration, because the sheet-metal-made inner pipe divided bodies 21 and 22 and the exhaust-air-inlet-side flange 12 are made using materials having different coefficients of thermal expansion, when the turbocharger is driven, the inner pipe divided bodies 21 and 22 made of the sheet metal undergo thermal deformation by the heat of the exhaust gas B to a greater extent than the exhaust-air-inlet-side flange 12 made by casting. This causes a clearance C between the inner pipe divided bodies 21 and 22 and the exhaust-air-inlet-side flange 12. At this time, a part of the exhaust gas B flows into the space G between the inner pipe 20 and the outer pipe 40 from the clearance C. In other words, the configuration allows entrance of the exhaust gas B to the space between the inner pipe 20 and the outer pipe 40.

In the first embodiment, a description has been given of a configuration in which a clearance is formed during the thermal deformation because materials having different coefficients of thermal expansion are respectively used for the inner pipe divided bodies 21 and 22 and the exhaustair-inlet-side flange 12. However, it may also be possible to employ a configuration in which the small clearance C is formed between the inner pipe divided bodies 21 and 22 and the exhaust-air-inlet-side flange 12 even at ordinary temperature.

As in a modification shown in FIG. 8, the inner pipe 20 (21*c*, 22*c*) may be fitted into the inner side of an inner surface of the exhaust-air-inlet-side flange 12.

In addition, as shown in FIGS. 2 to 4, bottom end portions 41*e* and 42*e* sides of the sheet-metal-made first outer pipe divided body 41 and the sheet-metal-made second outer pipe divided body 42 constituting the outer pipe 40 are respectively formed to have the curved half-arc shape so as to follow the outer circumferential surface 12*b* of the exhaust-air-inlet-side flange 12, and the first outer pipe divided body 41 and the second outer pipe divided body 42 are fixed to the outer circumferential surface 12*b* by being welded (a welded portion is shown by the reference sign E). A plurality of screw holes for attaching bolts (not shown) are formed in the exhaust-air-inlet-side flange 12 at equal intervals.

Furthermore, as shown in FIGS. 3 and 4, the exhaust-air-outlet-side flange 13 is formed to have a substantially rectangular plate shape, and a circular opening portion 13*a* forms the outlet of the exhaust gas B at its center. To an inner circumferential surface 13*b* of the exhaust-air-outlet-side flange 13, a rear-side end portion 35 of the exhaust tube 30 and respective end portions 41*d* and 42*d* of the sheet-metal-made first outer pipe divided body 41 and the sheet-metal-made second outer pipe divided body 42 constituting the outer pipe 40 on the rear circumferential edge side are fixed by being welded (a welded portion is shown by the reference sign E). Screw holes 13*d* for attaching bolts are respectively formed on corner portions of the exhaust-air-outlet-side flange 13.

As described above, in the turbine housing 10 of the first embodiment, as shown in FIG. 4, the regional part of the inner pipe (scroll portion) 20 having the spiral exhaust gas flow path K facing the turbine wheel 14 as the region on the side of the exhaust air outlet of the exhaust gas B is formed of the cast-metal-made inner pipe divided body (the cast-metal-made scroll member) 23. The remaining regional part of the inner pipe 20 is formed of the sheet-metal-made inner pipe divided bodies (the sheet-metal-made scroll plate members) 21 and 22. Furthermore, in the turbine housing 10, the cylinder shaped portion 24 is integrally formed on the exhaust air outlet side of the cast-metal-made inner pipe divided body 23 so as to project out, and the front-side end portion 31 of the exhaust tube 30 is fitted into and fixed to the cylinder shaped portion 24. In accordance with such a configuration, it is possible to reliably prevent occurrence of thermal deformation, cracks, and so forth in the region on the side of the exhaust air outlet of the exhaust gas B of the inner pipe 20 (including the exhaust tube 30) with a simple configuration. It is also possible to further improve rigidity of the region on the side of the exhaust air outlet of the exhaust gas B of the inner pipe 20. With such a configuration, a clearance (tip clearance) between the cast-metal-made inner pipe divided body 23 of the inner pipe 20 and the turbine wheel 14 can be secured over a period of time with ease and with reliability.

In addition, the inner pipe 20 forming the spiral exhaust gas flow path K is constituted from the sheet-metal-made inner pipe divided bodies 21 and 22, which are formed by being divided into two members, the cast-metal-made inner pipe divided body 23 that is located at the regional part facing the turbine wheel 14, and the sheet-metal-made cylinder shaped exhaust tube 30. The inner pipe 20 is covered by the outer pipe 40 constituted from the sheet-metal-made outer pipe divided bodies 41 and 42, which are formed by being divided into two members, such that the predetermined spacing G is formed between the inner pipe 20 and the outer pipe 40. With such a configuration, it is possible to protect the inner pipe 20 with the outer pipe 40, and it is also possible to reliably prevent leakage of the exhaust gas B from the outer pipe 40 to the outside.

Furthermore, as shown in FIGS. 4 and 5A, the cylinder shaped portion 24 is integrally formed on the exhaust air outlet side of the cast-metal-made inner pipe divided body 23 so as to project out. The side of the inner pipe 20 towards the front-side end portion 31 of the exhaust tube 30 is attached to the outer circumferential surface 24*a* of the cylinder shaped portion 24 in a freely slidable manner with the intervening sealing ring 25. In accordance with such a configuration, it is possible to allow displacement of the inner pipe (scroll portion) 20 having the spiral exhaust gas flow path K due to the thermal expansion, and it is also possible to effectively absorb the thermal expansion of the inner pipe 20. With such a configuration, it is possible to increase durability of the inner pipe 20 including the exhaust tube 30 on the exhaust-air-outlet-side, and at the same time, it is possible to secure the clearance (the tip clearance) between the inner pipe 20 and the turbine wheel 14 over a period of time with ease and with reliability. In addition, the side of the inner pipe 20 towards the front-side end portion 31 of the exhaust tube 30 is attached to the outer circumferential surface 24*a* of the cylinder shaped portion 24 in a freely slidable manner with the intervening sealing ring 25. With such a configuration, it is possible to allow the exhaust gas B to be discharged from the outlet 13*a* of the exhaust-air-outlet-side flange 13 with reliability without causing leakage of the exhaust gas B on the exhaust air outlet side via the exhaust tube 30, and at the same time, it is possible to prevent the exhaust gas from bypassing the turbine wheel 14 (leakage of the gas) to ensure highly efficient turbo performance. In addition, it is possible to easily assemble the sealing ring 25 to the annular shaped recessed groove portion 24*c* of the outer circumferential surface 24*a* of the cylinder shaped portion 24 only by opening the both end portions 25*a* and 25*b* outwards.

Furthermore, by using the scroll plate member made of the cast metal, which is formed by casting as a material having higher heat resistance than the material made of the sheet metal, it is possible to produce the third inner pipe divided body 23 located at the region on the side of the exhaust air outlet of the exhaust gas B forming a part of the inner pipe 20 with ease and with reliability.

Furthermore, in the first embodiment, the turbine housing 10 is configured such that the clearance C is formed between the recessed portion 12*c* of the exhaust-air-inlet-side flange 12 and the bottom end portions 21*c* and 22*c* of the inner pipe 20 and such that a gap between the outer circumferential surface 24*a* of the cylinder shaped portion 24 and the exhaust tube 30 is sealed by attaching them in a freely slidable manner with the intervening sealing ring 25. In accordance with such a configuration, a part of the exhaust gas B flows into the space G between the inner pipe 20 and the outer pipe 40 and the leakage of a part of the exhaust gas B from between the outer circumferential surface 24*a* of the cylinder shaped portion 24 and the exhaust tube 30 is prevented, and therefore, it is possible to improve the heat retaining property of the turbine housing 10.

In addition, as described in the modification shown in FIG. 8, when the configuration in which the inner pipe 20 is positioned inside the exhaust-air-inlet-side flange 12 is employed, it becomes easier for the part of the exhaust gas B to flow into the clearance C, and so, it is possible to further improve the heat retaining property of the turbine housing 10.

Second Embodiment

Figure 9A:
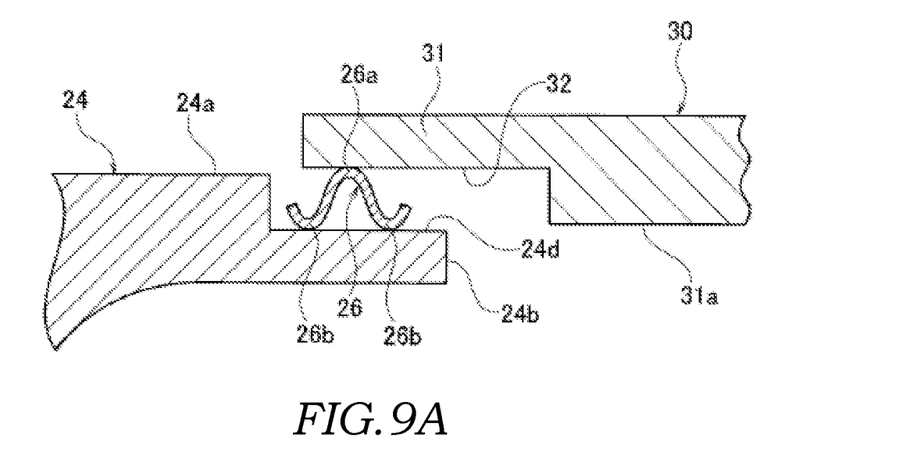
FIG. 9A is a partially enlarged sectional view showing the sealing state between the cast-metal-made scroll member and the exhaust tube of the turbine housing of a second embodiment of the present invention.

A second embodiment will be described. FIG. 9A is a partially enlarged sectional view showing the sealing state between the cast-metal-made scroll member and the exhaust tube in the turbine housing of the second embodiment of the present invention, and FIG. 9B is a front view of the sealing ring used for the sealing between the cast-metal-made scroll member and the exhaust tube.

In the second embodiment, a cutout portion (accommodating portion) 24d having a rectangular sectional shape for accommodating a sealing ring 26 is formed on the cylinder shaped portion 24 of the cast-metal-made inner pipe divided body (the cast-metal-made scroll member) 23 of the turbine housing 10 so as to extend from the outer circumferential surface 24a to a rear end surface (end surface) 24b in an annular shape. The sealing ring (sealing member) 26 is press fitted into the cutout portion 24d having the annular shape. A cutout portion 32 having a rectangular sectional shape is formed on the exhaust tube 30 of the inner pipe 20 on the side of the inner circumferential surface 31a of the front-side end portion 31 so as to have an annular shape. The cutout portion 32 of the exhaust tube 30 is attached to the cutout portion 24d of the cylinder shaped portion 24 in a freely slidable manner with the intervening sealing ring 26.

Figure 9B:
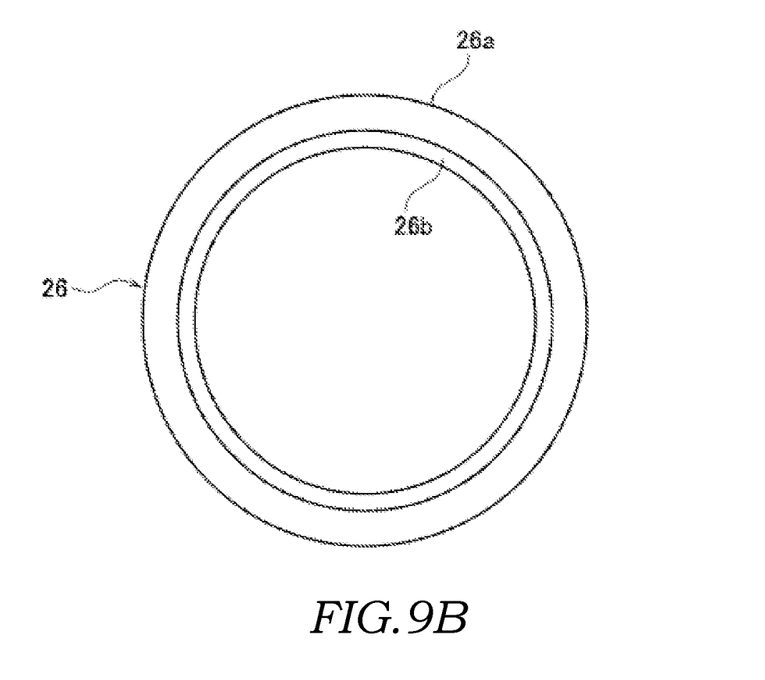
FIG. 9B is a front view of the sealing ring used for the sealing between the cast-metal-made scroll member and the exhaust tube.

In addition, as shown in FIGS. 9A and 9B, the sealing ring 26 is formed to have an O-shape when viewed in the front view and an Ω-shape when viewed in the sectional view. The cutout portion 32 in the front-side end portion 31 of the exhaust tube 30 is supported by a peak portion 26a of the sealing ring 26 in a freely slidable manner, and both base portions 26b and 26b of the sealing ring 26 are brought into pressure contact with the cutout portion 24d of the cylinder shaped portion 24.

As described above, in the second embodiment, the cutout portion 24d is formed over the outer circumferential surface 24a of the cylinder shaped portion 24 and the rear end surface 24b so as to have the annular shape. The sealing ring 26 having the O-shape when viewed in the front view and the Ω-shape when viewed in the sectional view is fitted into the cutout portion 24d having the annular shape. Furthermore, the cutout portion 32 on the side of the inner circumferential surface 31a of the front-side end portion 31 of the exhaust tube 30 of the inner pipe 20 is supported in a freely slidable manner by the peak portion 26a of the sealing ring 26 having the Ω-shape when viewed in the sectional view. In accordance with such a configuration, it is possible to allow displacement of the inner pipe (scroll portion) 20 having the spiral exhaust gas flow path K due to the thermal expansion, and it is also possible to effectively absorb the thermal expansion of the inner pipe 20. With such a configuration, it is possible to increase durability of the inner pipe 20 including the exhaust tube 30 on the exhaust-air-outlet-side, and at the same time, it is possible to secure the clearance (the tip clearance) between the inner pipe 20 and the turbine wheel 14 over a period of time with ease and with reliability. In addition, it is possible to allow the exhaust gas B to be discharged from the outlet 13a of the exhaust-air-outlet-side flange 13 with reliability without causing leakage of the exhaust gas B on the exhaust air outlet side via the exhaust tube 30, and at the same time, it is possible to prevent the exhaust gas from bypassing the turbine wheel 14 (leakage of the gas) to ensure highly efficient turbo performance.

Third Embodiment

Figure 10A:
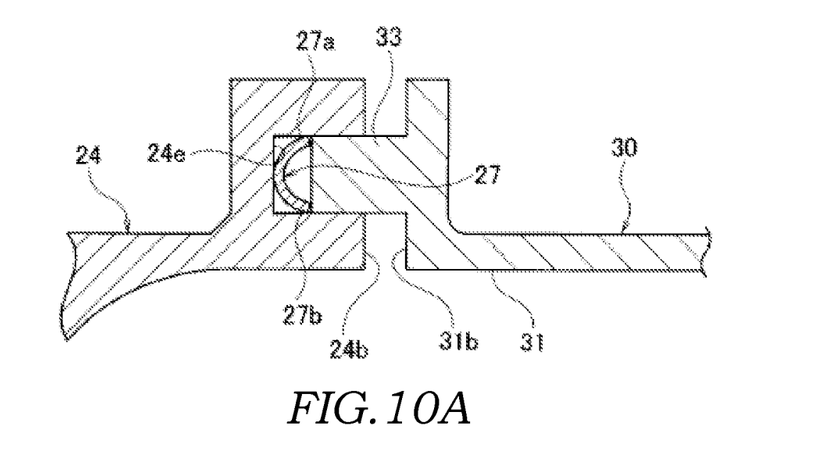
FIG. 10A is a partially enlarged sectional view showing the sealing state between the cast-metal-made scroll member and the exhaust tube of the turbine housing of a third embodiment of the present invention.

A third embodiment will be described. FIG. 10A is a partially enlarged sectional view showing the sealing state between the cast-metal-made scroll member and the exhaust tube of the turbine housing of the third embodiment of the present invention, and FIG. 10B is a front view of the sealing ring used for the sealing between the cast-metal-made scroll member and the exhaust tube.

In the third embodiment, on the cylinder shaped portion 24 of the cast-metal-made inner pipe divided body (the cast-metal-made scroll member) 23 of the turbine housing 10, a recessed groove portion (accommodating portion) 24e for accommodating a sealing ring 27 is formed on the rear end surface 24b so as to have an annular shape. The sealing ring (sealing member) 27 is fitted into the recessed groove portion 24e having the annular shape. In addition, a protruded portion 33 having an annular shape is integrally formed on a front end surface (end surface) 31b of the front-side end portion 31 of the exhaust tube 30 of the inner pipe 20 so as to protrude out. The annular-shaped protruded portion 33 on the front end surface 31b of the front-side end portion 31 of the exhaust tube 30 is attached to the annular-shaped recessed groove portion 24e on the rear end surface 24b of the cylinder shaped portion 24 in a freely slidable manner with the intervening sealing ring 27.

Figure 10B:
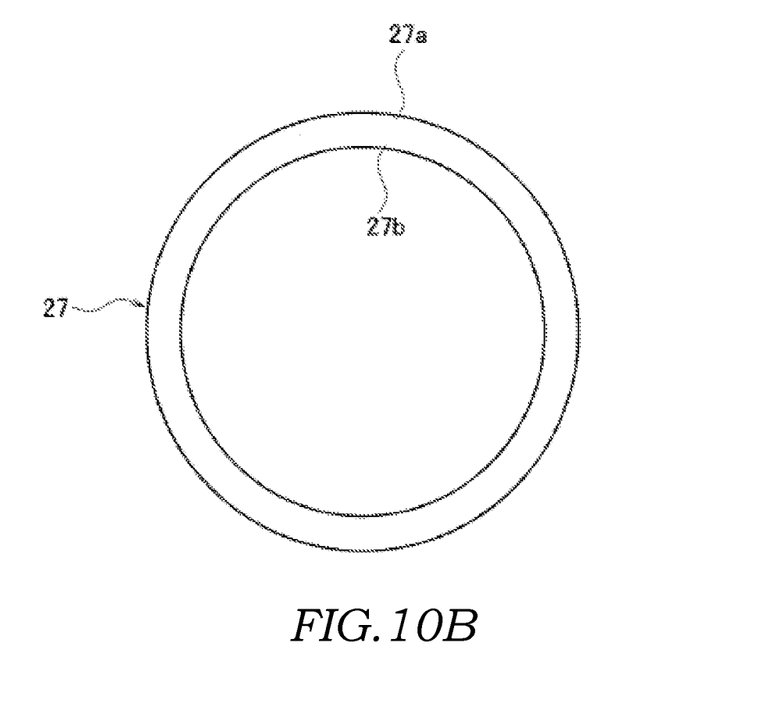
FIG. 10B is a front view the sealing ring used for the sealing between the cast-metal-made scroll member and the exhaust tube.

In addition, as shown in FIGS. 10A and 10B, the sealing ring 27 is formed to have an O-shape when viewed in the front view and a C-shape when viewed in the sectional view. An upper edge portion 27a and a lower edge portion 27b of the sealing ring 27 are brought into pressure contact with an upper surface and a lower surface of the recessed groove portion 24e of the cylinder shaped portion 24, respectively.

As described above, in the third embodiment, the recessed groove portion 24e is formed on the rear end surface 24b of the cylinder shaped portion 24 so as to have an annular shape. The sealing ring 27 having the O-shape when viewed in the front view and the C-shape when viewed in the sectional view is fitted into the recessed groove portion 24e having the annular shape. Furthermore, the protruded portion 33 having the annular shape is integrally formed on the front end surface 31b of the front-side end portion 31 of the exhaust tube 30 of the inner pipe 20 so as to protrude out. The annular-shaped protruded portion 33 on the front end surface 31b of the front-side end portion 31 of the exhaust tube 30 is attached to the recessed groove portion 24e having the annular shape on the rear end surface 24b of the cylinder shaped portion 24 in a freely slidable manner with the intervening sealing ring 27. In accordance with such a configuration, it is possible to allow displacement of the inner pipe (scroll portion) 20 having the spiral exhaust gas flow path K due to the thermal expansion, and it is also possible to effectively absorb the thermal expansion of the inner pipe 20. With such a configuration, it is possible to increase durability of the inner pipe 20 including the exhaust tube 30 on the exhaust-air-outlet-side, and at the same time, it is possible to secure the clearance (the tip clearance) between the inner pipe 20 and the turbine wheel 14 over a period of time with ease and with reliability. In addition, it is possible to allow the exhaust gas B to be discharged from the outlet 13a of the exhaust-air-outlet-side flange 13 with reliability without causing leakage of the exhaust gas B on the exhaust air outlet side via the exhaust tube 30, and at the same time, it is possible to prevent the exhaust gas from bypassing the turbine wheel 14 (leakage of the gas) to ensure highly efficient turbo performance.

According to the above-mentioned respective embodiments, although a description has been given of a configuration in which the inner pipe is entirely covered with the outer pipe, it may be, of course, possible to employ a configuration in which the inner pipe is not entirely covered with the outer pipe. In addition, according to the above-mentioned respective embodiments, although a description has been given of a configuration in which the inner pipe main body is constituted from a plurality of divided bodies, the configuration of the inner pipe main body is not limited to, of course, the divided bodies.

In addition, according to the above-mentioned respective embodiments, although the scroll plate member made of the cast metal, which is formed by casting as a material having higher heat resistance than the material made of the sheet metal, are employed, it may be possible to employ the scroll plate member made of other materials than the cast metal.

With the turbine housing according to one aspect of the present invention, it is possible to increase durability on the exhaust air outlet side of the inner pipe including the exhaust tube, and at the same time, a clearance (tip clearance) between the inner pipe and the turbine wheel can be secured over a period of time with ease and with reliability. In addition, because the end portion side of the exhaust tube of the inner pipe is attached to the barrel shaped portion with the intervening sealing member in a freely slidable manner, it is possible to ensure highly efficient turbo performance.

REFERENCE SIGNS LIST

10: turbine housing
12: exhaust-air-inlet-side flange
12*a*: opening portion (inlet of exhaust gas)
13: exhaust-air-outlet-side flange
13*a*: opening portion (outlet of exhaust gas)
14: turbine wheel
20: inner pipe (scroll portion)
20*a*: inner pipe main body portion
21: sheet-metal-made first inner pipe divided body (sheet-metal-made scroll member)
22: sheet-metal-made second inner pipe divided body (sheet-metal-made scroll member)
23: cast-metal-made third inner pipe divided body (cast-metal-made scroll member having higher heat resistance than sheet-metal-made scroll member, cast portion)
24: cylinder shaped portion (barrel shaped portion)
24*a*: outer circumferential surface
24*b*: rear end surface (end surface)
24*c*: recessed groove portion (accommodating portion)
24*d*: cutout portion (accommodating portion)
24*e*: recessed groove portion (accommodating portion)
25: sealing ring (sealing member)
26: sealing ring (sealing member)
26*a*: peak portion
27: sealing ring (sealing member)
30: sheet-metal-made exhaust tube
31: end portion
31*a*: inner circumferential surface
31*b*: front end surface (end surface)
32: cutout portion
33: protruded portion
40: outer pipe
41: sheet-metal-made first outer pipe divided body (sheet-metal-made outer pipe member)
42: sheet-metal-made second outer pipe divided body (sheet-metal-made outer pipe member)
B: exhaust gas
K: spiral exhaust gas flow path (exhaust air flow path)
G: space (predetermined spacing)
C: clearance

The invention claimed is:

1. A turbine housing comprising an inner pipe and an outer pipe, the inner pipe being configured to form an exhaust air flow path between an exhaust-air-inlet-side flange forming an inlet of exhaust gas and an exhaust-air-outlet-side flange forming an outlet of the exhaust gas, the outer pipe being configured to cover the inner pipe such that a predetermined spacing is formed between the inner pipe and the outer pipe, wherein
the inner pipe has:
an inner pipe main body configured to form the exhaust air flow path having a spiral shape, the inner pipe main body being connected to the exhaust-air-inlet-side flange such that the exhaust gas is allowed to enter between the inner pipe and the outer pipe; and
an exhaust tube attached to the exhaust air outlet side of the inner pipe main body with a sealing,
the outer pipe is welded to an outer circumference of the exhaust-air-inlet-side flange,
a rib is provided on an inner circumferential side of a downstream-side end portion, in a flow of the exhaust gas, of the exhaust-air-inlet-side flange, the rib forming a recessed portion with the outer pipe, and the end portion of the inner pipe main body on the exhaust air inlet side is inserted into the recessed portion, and
a clearance is formed between the rib and the end portion of the inner pipe main body on the exhaust air inlet side, and a clearance is also formed between a bottom surface of the recessed portion and the end portion of the inner pipe main body on the exhaust air inlet side.

2. A turbine housing comprising an inner pipe and an outer pipe, the inner pipe being configured to form an exhaust air flow path between an exhaust-air-inlet-side flange forming an inlet of exhaust gas and an exhaust-air-outlet-side flange forming an outlet of the exhaust gas, the outer pipe being configured to cover the inner pipe such that a predetermined spacing is formed between the inner pipe and the outer pipe, wherein
the inner pipe has:
an inner pipe main body configured to form the exhaust air flow path having a spiral shape, the inner pipe main body being connected to the exhaust-air-inlet-side flange such that the exhaust gas is allowed to enter between the inner pipe and the outer pipe; and
an exhaust tube attached to the exhaust air outlet side of the inner pipe main body with a sealing,
an end portion of the exhaust-air-inlet-side flange is formed to have a step shape, the step shape having a first inner diameter and a second inner diameter larger than the first inner diameter,
an inner diameter of an end portion of the inner pipe main body on an exhaust air inlet side is larger than the first inner diameter, but smaller than the second inner diameter, and
the end portion of the exhaust-air-inlet-side flange is inserted between a regional part configured to form the first inner diameter and a regional part configured to form the second inner diameter of an exhaust-air-inlet-side end portion of the inner pipe main body.

3. The turbine housing according to claim 1, wherein
the exhaust tube is attached to the exhaust air outlet side of the inner pipe main body in a freely slidable manner with the sealing by a sealing member,
the inner pipe main body has a cast portion,
the exhaust tube is made of sheet metal, and
an accommodating portion configured to accommodate the sealing member is formed in the cast portion.

4. The turbine housing according to claim 3, wherein
the accommodating portion is a recessed groove portion having an annular shape formed in an outer circumferential surface of the inner pipe main body on the exhaust air outlet side,
the sealing member is a sealing member having a C-shape when viewed in a front view, the sealing member being fitted into the recessed groove portion having the annular shape, and
one end portion side of the exhaust tube is attached to the outer circumferential surface in a freely slidable manner with the intervening sealing member having the C-shape.

5. The turbine housing according to claim 3, wherein
the accommodating portion is a cutout portion having an annular shape formed in an outer circumferential surface of an exhaust-air-outlet-side end portion of the inner pipe main body,
the sealing member is a sealing member having an O-shape when viewed in a front view and a C-shape when viewed in a sectional view, the sealing member being fitted into the cutout portion having the annular shape, and
an inner circumferential surface side of the one end portion of the exhaust tube is supported on the outer circumferential surface by a peak portion of the sealing member having the C-shape in a freely slidable manner.

6. The turbine housing according to claim 3, wherein
the accommodating portion is a recessed groove portion having an annular shape formed on an end surface of an exhaust-air-outlet-side end portion of the inner pipe main body,
the sealing member is a sealing member having O-shape when viewed in a front view and C-shape when viewed in a sectional view, the sealing member being fitted into the recessed groove portion having the annular shape, and
a protruded portion having an annular shape is formed on the end surface of the one end portion of the exhaust tube, the protruded portion having the annular shape being attached to the recessed groove portion having the annular shape in a freely slidable manner with the intervening sealing member.

7. The turbine housing according to claim 1, wherein
the inner pipe main body has a cast-metal-made first scroll member having higher heat resistance than a sheet-metal-made scroll member; and a sheet-metal-made second scroll member.

8. The turbine housing according to claim 2, wherein
the exhaust tube is attached to the exhaust air outlet side of the inner pipe main body in a freely slidable manner with the sealing by a sealing member,
the inner pipe main body has a cast portion,
the exhaust tube is made of sheet metal, and
an accommodating portion configured to accommodate the sealing member is formed in the cast portion.

9. The turbine housing according to claim 8, wherein
the accommodating portion is a recessed groove portion having an annular shape formed in an outer circumferential surface of the inner pipe main body on the exhaust air outlet side,
the sealing member is a sealing member having a C-shape when viewed in a front view, the sealing member being fitted into the recessed groove portion having the annular shape, and
one end portion side of the exhaust tube is attached to the outer circumferential surface in a freely slidable manner with the intervening sealing member having the C-shape.

10. The turbine housing according to claim 8, wherein
the accommodating portion is a cutout portion having an annular shape formed in an outer circumferential surface of an exhaust-air-outlet-side end portion of the inner pipe main body,
the sealing member is a sealing member having an O-shape when viewed in a front view and an C-shape when viewed in a sectional view, the sealing member being fitted into the cutout portion having the annular shape, and
an inner circumferential surface side of the one end portion of the exhaust tube is supported on the outer circumferential surface by a peak portion of the sealing member having the C-shape in a freely slidable manner.

11. The turbine housing according to claim 8, wherein
the accommodating portion is a recessed groove portion having an annular shape formed on an end surface of an exhaust-air-outlet-side end portion of the inner pipe main body,
the sealing member is a sealing member having O-shape when viewed in a front view and C-shape when viewed in a sectional view, the sealing member being fitted into the recessed groove portion having the annular shape, and
a protruded portion having an annular shape is formed on the end surface of the one end portion of the exhaust tube, the protruded portion having the annular shape being attached to the recessed groove portion having the annular shape in a freely slidable manner with the intervening sealing member.

12. The turbine housing according to claim 2, wherein the inner pipe main body has a cast-metal-made first scroll member having higher heat resistance than a sheet-metal-made scroll member; and a sheet-metal-made second scroll member.

* * * * *